United States Patent
Herrington et al.

(10) Patent No.: US 7,297,268 B2
(45) Date of Patent: *Nov. 20, 2007

(54) DUAL HEAD PUMP DRIVEN FILTRATION SYSTEM

(75) Inventors: Rodney E. Herrington, Albuquerque, NM (US); Frank R. Hand, Albuquerque, NM (US)

(73) Assignee: MIOX Corporation, Albuquerque, NM (US)

( * ) Notice: Subject to any disclaimer, the term of this patent is extended or adjusted under 35 U.S.C. 154(b) by 288 days.

This patent is subject to a terminal disclaimer.

(21) Appl. No.: 10/759,753

(22) Filed: Jan. 16, 2004

(65) Prior Publication Data

US 2004/0178145 A1   Sep. 16, 2004

Related U.S. Application Data

(63) Continuation-in-part of application No. PCT/US02/22618, filed on Jul. 16, 2002, application No. 10/759,753, which is a continuation-in-part of application (Continued)

(60) Provisional application No. 60/305,912, filed on Jul. 16, 2001, provisional application No. 60/266,659, filed on Feb. 5, 2001, provisional application No. 60/230,895, filed on Sep. 5, 2000.

(51) Int. Cl.
 *B01D 63/00* (2006.01)
 *B01D 63/10* (2006.01)
 *B01D 61/06* (2006.01)
 *B01D 61/00* (2006.01)

(52) U.S. Cl. .............. 210/321.66; 210/650; 210/652; 210/97; 210/101; 210/321.65; 210/321.76; 210/321.85; 417/323; 417/264; 417/404

(58) Field of Classification Search .............. None
See application file for complete search history.

(56) References Cited

U.S. PATENT DOCUMENTS 1,029,580 A    6/1912    Bane
(Continued)

FOREIGN PATENT DOCUMENTS

DE            19748997       5/1999
(Continued)

OTHER PUBLICATIONS

"Steri-Pen" *Internet advertisement by Hydro-Photon*, www.hydro-photon.com, (May 9, 2000).

(Continued)

*Primary Examiner*—Krishnan S. Menon
(74) *Attorney, Agent, or Firm*—Deborah A. Peacock; Philip D. Askenazy; Peacock Myers, P.C.

(57) ABSTRACT

Improvements in product water throughput from a reverse osmosis (RO) membrane achieved by thinner feed spacers in the RO element (22), enhanced recovery (ratio of permeate to feed), pressure recovery of the retentate fluid pressure opposing the feed water pressure, and fluid pulsing of the RO element feed stream. These features are preferably combined to optimize the performance and cost per unit volume of water produced. The system of the invention preferably comprises a dual head reciprocating pump (20), an RO element (22) with a housing, and a differential pressure activated ("DPA") valve (24). The DPA valve (24), in combination with offsetting fluid pressures on the two pump heads (28, 30), generate energy recovery. The frequency and amplitude of the reciprocating pump (20) create a pulse wave in the RO element (22) that improves permeate quality and throughput. A control system preferably monitors system parameters to optimize the reciprocating pump (20) speed and amplitude to tune the optimal frequency and amplitude required for maximum throughput and permeate quality from any given RO element (22) configuration.

57 Claims, 1 Drawing Sheet

Related U.S. Application Data

No. 09/907,092, filed on Jul. 16, 2001, now Pat. No. 6,736,966, and a continuation-in-part of application No. 09/514,431, filed on Feb. 28, 2000, now abandoned, which is a continuation-in-part of application No. 09/318,469, filed on May 25, 1999, now abandoned, which is a continuation-in-part of application No. 09/318,468, filed on May 25, 1999, now Pat. No. 6,261,464, which is a continuation-in-part of application No. 09/686,214, filed on Oct. 10, 2000, now Pat. No. 6,558,537, and a continuation-in-part of application No. PCT/US00/14513, filed on May 25, 2000, and a continuation-in-part of application No. 09/579,178, filed on May 24, 2000, now Pat. No. 6,524,475, application No. 10/759,753, which is a continuation-in-part of application No. 10/382,971, filed on Mar. 5, 2003, which is a continuation-in-part of application No. PCT/US00/33254, filed on Dec. 8, 2000.

(56) References Cited

U.S. PATENT DOCUMENTS

| | | | |
|---|---|---|---|
| 1,160,528 A | 11/1915 | Pilkington | |
| 1,200,165 A | 10/1916 | Burgess | |
| 2,473,986 A | 6/1949 | Booth | 210/185 |
| 3,222,269 A | 12/1965 | Stanton | 204/270 |
| 3,365,061 A | 1/1968 | Bray | 210/130 |
| 3,505,215 A | 4/1970 | Bray | 210/22 |
| 3,558,242 A | 1/1971 | Jenkyn-Thomas | |
| 3,622,479 A | 11/1971 | Schneider | 204/149 |
| 3,654,148 A | 4/1972 | Bradley | 210/23 |
| 3,791,768 A | 2/1974 | Wanner | 417/393 |
| 3,825,122 A | 7/1974 | Taylor | 210/134 |
| 4,000,065 A | 12/1976 | Ladha et al. | 210/23 |
| 4,070,280 A | 1/1978 | Bray | |
| 4,077,883 A | 3/1978 | Bray | 210/136 |
| 4,124,488 A | 11/1978 | Wilson | 210/134 |
| 4,151,092 A | 4/1979 | Grimm et al. | 210/256 |
| 4,178,240 A | 12/1979 | Pinkerton | 210/22 |
| 4,187,173 A | 2/1980 | Keefer | 210/23 |
| 4,219,424 A | 8/1980 | Tamura et al. | 210/201 |
| 4,288,326 A | 9/1981 | Keefer | 210/637 |
| 4,290,873 A | 9/1981 | Weaver | 204/228 |
| 4,306,952 A | 12/1981 | Jansen | 204/149 |
| 4,321,137 A | 3/1982 | Kohler | 210/137 |
| 4,367,140 A | 1/1983 | Wilson | 210/110 |
| 4,389,311 A | 6/1983 | La Freniere | 210/198 |
| 4,432,876 A | 2/1984 | Keefer | 210/652 |
| 4,434,056 A | 2/1984 | Keefer | 210/637 |
| 4,496,443 A | 1/1985 | Mack et al. | 204/130 |
| 4,534,713 A | 8/1985 | Wanner | 417/377 |
| 4,560,455 A | 12/1985 | Porta et al. | 204/130 |
| RE32,144 E | 5/1986 | Keefer | 210/637 |
| 4,632,754 A | 12/1986 | Wood | 210/257.2 |
| 4,722,263 A | 2/1988 | Valentin | 92/13.7 |
| 4,724,079 A | 2/1988 | Sale et al. | 210/638 |
| 4,744,877 A | 5/1988 | Maddock | 204/266 |
| 4,756,830 A | 7/1988 | Fredkin | 210/321.66 |
| 4,759,844 A | 7/1988 | Lipschultz et al. | 210/257.2 |
| 4,761,208 A | 8/1988 | Gram et al. | 204/95 |
| 4,765,807 A | 8/1988 | Henriksen | 55/51 |
| 4,786,380 A | 11/1988 | van Duin et al. | 204/95 |
| 4,790,923 A | 12/1988 | Stillman | 204/268 |
| 4,790,946 A | 12/1988 | Jansen | 210/748 |
| 4,836,924 A | 6/1989 | Solomon | 210/321.87 |
| 4,861,487 A * | 8/1989 | Fulk, Jr. | 210/644 |
| RE33,135 E | 12/1989 | Wanner, Sr., et al. | 417/377 |
| 4,973,408 A | 11/1990 | Keefer | 210/652 |
| 4,976,842 A | 12/1990 | Fowler | |
| 5,006,352 A | 4/1991 | Zelenak nee Zoltai et al. | 426/67 |
| 5,085,753 A | 2/1992 | Sherman | 204/267 |
| 5,207,916 A | 5/1993 | Goheen et al. | 210/637 |
| 5,244,579 A | 9/1993 | Horner et al. | 210/652 |
| 5,295,519 A | 3/1994 | Baker et al. | 141/18 |
| 5,306,428 A | 4/1994 | Tonner | 210/652 |
| 5,320,718 A | 6/1994 | Molter et al. | 204/101 |
| 5,324,666 A | 6/1994 | Siepmann et al. | 436/62 |
| 5,358,635 A | 10/1994 | Frank et al. | |
| 5,480,386 A | 1/1996 | Brohy | 604/131 |
| 5,492,534 A | 2/1996 | Athayde et al. | 604/141 |
| 5,496,466 A | 3/1996 | Gray | 210/137 |
| 5,503,736 A | 4/1996 | Schoenmeyr | 210/91 |
| 5,531,887 A | 7/1996 | Miers | 210/135 |
| 5,534,145 A | 7/1996 | Platter et al. | 210/90 |
| 5,540,355 A | 7/1996 | Hancock et al. | 222/56 |
| 5,540,848 A | 7/1996 | Engelhard | 210/748 |
| 5,558,762 A | 9/1996 | Fife et al. | 210/130 |
| 5,581,189 A | 12/1996 | Brenn | 324/439 |
| 5,597,482 A | 1/1997 | Melyon | 210/209 |
| 5,647,416 A | 7/1997 | Desrosiers et al. | 141/351 |
| 5,685,980 A | 11/1997 | Patapoff et al. | 210/244 |
| 5,699,669 A | 12/1997 | Gebhard | 42/3.64 |
| 5,725,758 A | 3/1998 | Chace et al. | 210/85 |
| 5,795,459 A | 8/1998 | Sweeney | 205/701 |
| 5,900,212 A | 5/1999 | Maiden et al. | 422/24 |
| 5,928,490 A | 7/1999 | Sweeney | 205/700 |
| 5,958,229 A | 9/1999 | Filiopoulos et al. | 210/206 |
| 5,989,396 A | 11/1999 | Prasnikar et al. | 204/290 |
| 6,007,686 A | 12/1999 | Welch et al. | 204/230.2 |
| 6,017,200 A | 1/2000 | Childs | |
| 6,017,447 A | 1/2000 | Wright et al. | 210/192 |
| 6,110,424 A | 8/2000 | Maiden et al. | 422/24 |
| 6,180,014 B1 | 1/2001 | Salama | 210/748 |
| 6,197,189 B1 | 3/2001 | Schwartz et al. | 210/192 |
| 6,203,696 B1 | 3/2001 | Pearson | 210/98 |
| 6,524,475 B1 | 2/2003 | Herrington et al. | 210/192 |
| 6,558,537 B1 | 5/2003 | Herrington et al. | 210/192 |
| 6,609,070 B1 * | 8/2003 | Lueck | 702/50 |
| 6,736,966 B2 | 5/2004 | Herrington et al. | 210/192 |
| 6,841,076 B1 * | 1/2005 | Wobben | 210/652 |

FOREIGN PATENT DOCUMENTS

| | | |
|---|---|---|
| EP | 0352902 | 1/1990 |
| WO | WO95/29130 | 11/1995 |
| WO | WO-9902245 | 1/1999 |

OTHER PUBLICATIONS

Gupta, B.B., et al., "Permeate flux enhancement by pressure and flow pulsations in microfiltration with mineral membranes", *Journal of Membrane Science 70*, 70,(1992),257-266.

Venczel, L.V., "Inactivation of Cryptosporidium parvum Oocysts and Clostridium perfringens Spores by a Mixed-Oxidant Disinfectant and by Free Chlorine", *Applied and Environmental Microbiology*, vol. 63, No. 4, (Apr. 1997), 1598-1601.

* cited by examiner

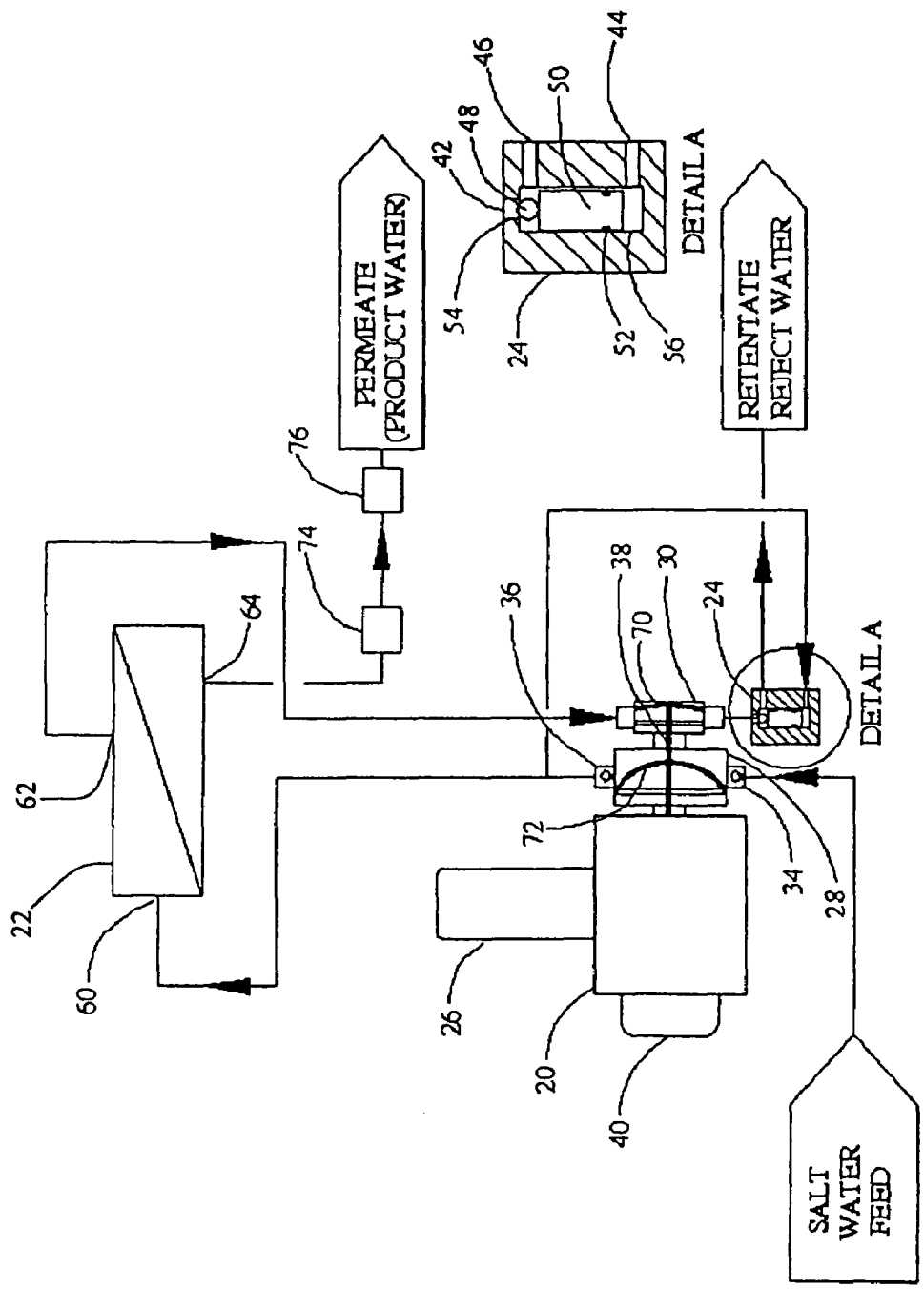
FIG. 1 DUAL DIAPHRAGM PUMP DRIVEN MEMBRANE SYSTEM

DUAL HEAD PUMP DRIVEN FILTRATION SYSTEM

CROSS-REFERENCE TO RELATED APPLICATIONS

This application is a continuation-in-part of PCT application Ser. No. PCT/US02/22618, entitled "Dual Head Driven Membrane System", filed on Jul. 16, 2002, which claims priority to U.S. Provisional Patent Application Ser. No. 60/305,912, entitled "In-Line Reverse Osmosis Pump", filed on Jul. 16, 2001.

This application is also a continuation-in-part of U.S. patent application Ser. No. 09/907,092, entitled "Portable Water Disinfection System", filed on Jul. 16, 2001 now U.S. Pat. No. 6,736,966, which is a continuation-in-part of, and claims priority to, U.S. patent application Ser. No. 09/318,468, entitled "Portable Water Disinfection System", filed on May 25, 1999, now issued as U.S. Pat. No. 6,261,464; and which is a continuation-in-part of U.S. patent application Ser. No. 09/514,431, entitled "Portable Disinfection and Filtration System", filed on Feb. 28, 2000 now abandoned, which is a continuation-in-part of U.S. patent application Ser. No. 09/318,469, entitled "Portable Water Filtration and Pump System", filed on May 25, 1999 now abandoned; and which is a continuation-in-part of U.S. patent application Ser. No. 09/579,178, entitled "Portable Water Disinfection System", filed May 24, 2000, now issued as U.S. Pat. No. 6,524,475; and which is a continuation-in-part of U.S. PCT/US00/14513, entitled "Portable Disinfection and Filtration System," filed May 25, 2000; and which is a continuation-in-part of U.S. patent application Ser. No. 09/686,214, entitled "Portable Hydration System," filed Oct. 10, 2000 now U.S. Pat. No. 6,558,537; and which claims priority to U.S. Provisional Patent Application Ser. No. 60/266,659, entitled "Mixed Oxidant Electrolytic Cell," filed Feb. 5, 2001.

This application is also a continuation-in-part of U.S. patent application Ser. No. 10/382,971, entitled "Filtration Membrane and Method for Making Same", filed on Mar. 5, 2003, which is a continuation of PCT application Ser. No. PCT/US00/33254, entitled "Reverse Osmosis Membrane and Process for Making Same," filed Dec. 8, 2000, which claims priority to U.S. Provisional Patent Application Ser. No. 60/230,895, entitled "Reverse Osmosis Membrane and Process for Making Same," filed on Sep. 5, 2000. The specifications of all of the references listed are incorporated herein by reference.

GOVERNMENT RIGHTS

The U.S. Government Defense Advanced Research Projects Agency ("DARPA"), has a paid-up license in this invention and the right in limited circumstances to require the patent owner to license others on reasonable terms as provided for by the terms of Contract No. DABT63-98-C-0052 awarded by DARPA.

BACKGROUND OF THE INVENTION

1. Field of the Invention (Technical Field)

The present invention relates to removing particulate and dissolved solids from water by spiral wrapped membrane elements utilizing a dual diaphragm pump system that preferably incorporates pressure recovery, pulsing, fixed recovery (ratio of permeate to feed), and thin feed spacer spiral wrapped membrane elements. The maximum benefit of the system is achieved when reverse osmosis ("RO") is utilized as the membrane technology due to the high pressures inherent in RO membrane processes. However, the system of the present invention is also effective on microfiltration, ultrafiltration, nanofiltration, and other membrane systems. More particularly the present invention relates to alternative means to increase the production of potable water per unit size of membrane element and to reduce the energy cost per unit volume of water treated.

2. Background Art

U.S. Pat. No. 5,496,466, to Gray, discloses a portable water purification system with a double piston pump comprising a feed water piston in a feed water cylinder, a concentrate pumping section for removing concentrate from concentrate output, and a concentrate pumping section including a concentrate cylinder and piston wherein the pistons move in opposite axially directions. Gray does not teach differential pressure control or use of a spring or other mechanism for storing energy to average out the forces of the respective strokes. Further, Gray teaches use of a two-piston system only.

U.S. Pat. No. 5,503,736, to Schoenmeyr, discloses a booster pump for a reverse osmosis water purification system wherein the pump has a spring return piston stroked by the pressure of feedwater and a pair of solenoid control valves (controlled by a piston position detector switch) that control the flow of feedwater into and out of the pump to move the piston between stroke and return positions. The Schoenmeyr patent, while disclosing a single piston, employs a two-headed piston with solenoid control valves and a control circuit system, unlike the differential pressure activated valve of the present invention.

Additional tangentially related prior art includes: U.S. Pat. No. 5,589,066, to Gray; U.S. Pat. No. 5,865,980 to Patapoff et al.; U.S. Pat. No. 3,966,364, to Bachle et al.; U.S. Pat. No. 5,531,887, to Miers; U.S. Pat. No. 4,740,301, to Lopez; and U.S. Pat. No. 3,830,372, to Manjikian.

SUMMARY OF THE INVENTION (DISCLOSURE OF THE INVENTION)

The present invention is of a pumping apparatus and method comprising: a dual head pump comprising a primary feed head comprising a feed diaphragm and a secondary retentate head comprising a retentate diaphragm; pumping fluid to at least one membrane surface; transferring force from the retentate diaphragm to the feed diaphragm to recover energy; providing a fixed recovery via the two heads; and imparting a pulsing pressure wave on the membrane surface. In the preferred embodiment, pumping fluid comprises providing feed fluid to a reverse osmosis membrane, preferably with at least one thin feed spacer element, and most preferably with at least one spiral wrapped element. Differential pressure is provided by a dual activated valve, pulsing is preferably hydraulic, and a plurality of membrane surfaces are provided, preferably wherein the spacing is reduced between the membrane surfaces to improve diffusion.

The present invention is also of a filtration system which provides an optimized pulsed fluid flow to a filtration element. The system comprises a pump, preferably a diaphragm pump, which preferably comprises a primary feed head and a secondary retentate head comprising different swept volumes. The heads are preferably connected either mechanically or hydraulically, wherein a force on the retentate head offsets the pumping force on the feed head. The filtration system preferably comprises a differential pressure activated valve, which seals the discharge port of the retentate head when the feed pressure exceeds the retentate pressure. The connection between the heads and the valve provide a pressure recovery to the system, reducing the energy required to operate the system. The filtration element is preferably a reverse osmosis element, preferably comprising a spiral wrapped element which comprises at least one membrane and at least one thin feed spacer, which preferably comprises a plastic web mesh. The spacer is preferably less than about 0.025 inches thick, and more preferably less than about 0.011 inches thick.

The filtration system preferably comprises automatic and/or manual controls to vary parameters of the system to optimize the permeate quality, flow rate, and system energy requirements. The parameters are preferably pulse frequency and pulse amplitude. The system optionally comprises at least one quality measurement device, including but not limited to a flow meter, conductivity meter, and/or ammeter, and optionally comprises a feedback loop to vary the parameters.

The present invention is also of a method for filtering a substance comprising the steps of providing at least one filtration element; providing a pump which pumps a pulsed flow of the substance to the filtration element; and varying at least one parameter of the pulsed flow to optimize a desired characteristic of permeate filtered by the filtration element and the pump. The pump is preferably a dual head diaphragm pump in which the heads are connected in order to provide pressure recovery, thereby reducing the energy required to filter the substance. The method preferably comprises the step of sealing a discharge port of a retentate head when a feed pressure exceeds a retentate pressure, preferably using a differential pressure activated valve. The filtration element is preferably a reverse osmosis element, preferably comprising a spiral wrapped element which comprises at least one membrane and at least one thin feed spacer, which preferably comprises a plastic web mesh.

The step of varying at least one parameter of the pulsed flow preferably comprises varying the pulse frequency and the pulse amplitude, and preferably further comprises measuring a desired characteristic of permeate, including but not limited to the permeate flow rate, the total dissolved solids in the permeate, and the amperage load on the pump. The method optionally comprises providing a feedback loop to automatically vary the parameter of the pulsed flow, thereby optimizing the desired characteristic of the permeate and pump.

The present invention is additionally of a pressure recovery filtration system comprising a dual head pump comprising a primary feed head, a secondary retentate head and a connection between the two heads; a filtration element; and a hydraulically actuated differential pressure activated valve. The heads preferably comprise diaphragms. The connection is preferably mechanical, optionally comprising a shaft, or alternatively hydraulic. The force on the secondary retentate head preferably offsets the force on the primary feed head. The valve preferably seals the discharge port of said retentate head when a feed pressure exceeds a retentate pressure, and preferably comprises an inlet port connected to said retentate head and an inlet port connected to said feed head. The valve preferably actuates according to a relative pressure difference between said inlet ports.

Objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated into and forms a part of the specification, illustrates one or more embodiments of the present invention and, together with the description, serves to explain the principles of the invention. The drawing is only for the purpose of illustrating one or more preferred embodiments of the invention and is not to be construed as limiting the invention. In the drawings:

FIG. 1 is a block diagram of the overall system of the present invention.

DESCRIPTION OF THE PREFERRED EMBODIMENTS (BEST MODES FOR CARRYING OUT THE INVENTION)

The present invention is of a motor driven dual headed pump that incorporates a differential pressure activated ("DPA") valve to provide a system that incorporates some or all of the innovations discussed previously. High Total Dissolved Solids ("TDS") feed water (e.g., seawater or brackish water) is sucked into the primary diaphragm head of a dual-headed diaphragm pump. The primary head of the pump is the larger of the two pump heads. Check valves on the inlet and exit of the pump head force water to be directed in one direction only through the pump head. As feed water discharges through primary pump head 28 (FIG. 1), the feed water enters the feed end of the RO element housing. Water passes longitudinally through the RO element. A portion of the water passes through the membrane producing clean permeate water. The remaining water is higher TDS concentration (relative to the TDS of the feed water) that is retentate discharge from the RO element. The retentate is directed to the second, smaller diaphragm pump head. The ratio of the sizes of the pump heads explicitly defines the recovery of the RO system. With the smaller pump head being, e.g., 70 percent of the volume of the primary pump head, the recovery of the system is approximately 30 percent. In other words, 30 percent of the feed volume is forced through the membranes of the RO element, thereby producing a permeate volume that is 30 percent of the feed. Various recovery ratios may be used depending upon the configuration of the system, and the fluid being treated. This feature addresses a first benefit of the invention, namely, enhanced recovery.

Incorporating RO elements in the system with a thin feed spacer provide additional capacity to the system. By utilizing the thin spacer, the capacity of an existing RO plant is increased significantly by simply replacing existing technology RO elements with the thin feed spacer elements, and then adding the dual diaphragm pump system to provide the benefits of that system.

Diaphragm pumps produce an inherent pulse to the fluid flow stream. This is by virtue of the reciprocal motion of the pump stroke mechanism. In conventional diaphragm pumps, the stroke of the pump is controlled by an adjustable eccentric mechanism within the gear housing of the pump. This is usually controlled by a control knob or motor drive on the exterior of the pump. The frequency of the pump is controlled by the speed of the drive motor on the pump. Most diaphragm pumps manufactured today can be driven by a variable speed motor. This combination of stroke length and speed control allows variability of all key operational parameters that are important to optimizing the flow characteristics within the RO element. In addition, by monitoring torque on the pump drive motor, the stroke length and frequency are electronically optimized, or tuned, so that the optimal stroke and frequency are established for the RO element size and hydraulic system in question. The optimum conditions are achieved when the torque (or load) on the motor is minimized at the rated flow rate of the membrane element. This feature addresses the benefits from fluid flow pulsing.

Another advantage is realized by connecting the two different sized pump diaphragms together. The feed pressure to the RO element is roughly equal to the retentate (or discharge) pressure from the RO element. Theoretically, flow through the feed spacer in the RO element is zero. Practically, there may be a pressure drop of about ten percent across the element. For purposes of example, assume that there is no pressure drop across the element. This means that the same pressure is applied on the large diaphragm pump head as there is on the small diaphragm pump head. By connecting the two diaphragms with a common shaft, hydraulics in the pump heads set up so that force on the small head opposes, or offsets, the force on the large head. Therefore, the net working force on the pump is equal to the value of the recovery of the RO element. In the example discussed here, the force generated by the small pump head (70 percent) offsets the force on the large head (100 percent) so that the net force required to operate the system is 30 percent. This is defined as pressure recovery. Stated in another fashion, the energy required to operate the RO system is 30 percent of that required to operate a system that is comprised of one diaphragm. Indeed, conventional RO plants use high pressure pumps to provide the feed pressure for the RO elements, with no attempts to utilize pressure recovery. This feature alone can save 70 percent of the energy required to operate an RO plant.

Thin feed spacers that provide more element surface in the RO element, combined with pressure recovery, can easily produce a 100 percent improvement in kilowatt per gallon of water produced. Pulsing benefits are not impacted by these two features. Pulsing contributes additional benefits that are not degraded by the additional RO surface area or the pressure recovery features.

All five of the benefits discussed above are not necessarily mutually beneficial. For example, the benefits of diffusion may be offset by pulsing.

The system integrates any or all of five features, or combinations thereof, of membrane technology for water treatment. The five features comprise the use of: (1) thin feed spacer spiral wrapped elements; (2) enhanced recovery (ratio of feed to permeate); (3) diffusion effects; (4) fluid pulsing; and (5) pressure recovery. The system offers maximum benefit for reverse osmosis (RO) membranes due to the high working pressures associated with seawater desalination. Those of ordinary skill in the art of membrane technology will recognize that this system also has benefit for fluids other than water, and for membrane technology that includes microfiltration, ultrafiltration, and nanofiltration, in addition to the obvious advantages to RO technology.

The preferred embodiment is illustrated in FIG. 1. As shown therein, pump 20 comprises a diaphragm pump design with two diaphragm heads, primary or feed head 28, and secondary or retentate head 30. In an alternate embodiment, the pump can be a plunger type pump, a hydraulic activated diaphragm pump, a solenoid activated pump, or other configuration. One key feature of the preferred pump configuration is that pump 20 imparts a pulsing fluid and pressure wave on the fluid being transferred. Another primary feature of pump 20 is that pump feed diaphragm 72 and retentate diaphragm 70 are connected preferably mechanically by shaft 38, or alternatively hydraulically, in order that the fluid pressure acting on retentate head 30 transfers force to feed head 28. The interconnectivity of feed diaphragm 72 and retentate diaphragm 70 ensures that fluid pressure on the left side of the diaphragm of retentate head 30 partially offsets fluid pressure on the right side of the diaphragm in feed head 28. This feature provides pressure recovery and significantly reduces the total energy to operate the system versus a system that utilizes feed pressure only.

High TDS feed water (e.g., seawater) enters or is sucked into feed head 28 at feed head inlet port 34. Lower TDS feed water (i.e., brackish water) or other waters of varying degrees of ion concentration also benefit from this system. Feed head inlet port 34 incorporates a check valve that prevents backflow of water out of feed head 28 during the pressure stroke of pump 20. Fluid is compressed on the right side of feed diaphragm 72 and is expelled out of feed head discharge port 36. Feed head discharge port 36 incorporates a check valve to prevent fluid downstream of feed head 28 from returning to feed head 28 during the suction stroke of pump 20. Fluid discharged from feed head 28 discharge port 36 is transferred to feed inlet port 60 on RO element 22.

Benefits of thin feed spacer designs in RO elements include more membrane surface per RO element volume, concentration polarization reduction via TDS diffusion effects, and increased surface velocity and shear, all of which contribute to increased RO element throughput and product water quality. Although thin feed spacers are preferable in the system of the present invention, conventional feed spacer elements may also be used. Thin feed spacer elements improve the overall efficiency and throughput of the system because there is more membrane area in the same element size housing.

Permeate, or product water, from RO element 22 is discharged through permeate water port 64. High TDS retentate water is discharged from RO element 22 via retentate discharge port 62. Assuming no expansion of RO element 22 and hydraulic lock of the system (no air), the law of conservation of mass dictates that the volume of water entering RO element 22 inlet port 60 equals the sum of the volume of water discharged at permeate discharge port 64 and retentate discharge port 62. Recovery in an RO element is defined as the volume of permeate (or product water) discharged from an RO element versus the feed water entering the element. Therefore, the recovery of an RO element is explicitly defined by the ratio of the swept volume of pump 20 feed head 28 versus the volume of retentate head 30. The difference in volume between the RO element feed volume and the retentate volume is the permeate, or product water, volume.

In order for energy recovery as well as fixed recovery (ratio of permeate to feed) to work, the discharge port retentate head 30 is closed in order for pressure to build up in the system. The ultimate pressure obtained is a function of the osmotic pressure of the feed water in RO element 22. Closure of the discharge port of retentate pump head 30 is achieved with differential pressure activated (DPA) valve 24. DPA valve 24 is activated by equal pressures applied across different diameter ports in DPA valve 24. Pressure is acted on the circular area of the back of piston 50 which is defined by the diameter of DPA valve bore 56. The force on the back of piston 50 is defined by the pressure multiplied by the area. The force on the front of piston 50 is defined by diameter 54 of inlet port 42. Since the pressures are unequal (feed and retentate), piston 50 is driven home with greater force on the rear of piston 50 to seal inlet port 42. Port 42 remains sealed during the compression stroke of pump 20. On the return stroke of pump 20, pressure in the system is relieved and there is no net force applied to piston 50 in DPA valve 24 to seal port 42. On the return stroke of pump 20, fluid on the left side of diaphragm 70 is driven through port 42 of DPA valve 24 and is expelled out of retentate discharge port 46. Fluid cannot back flow out of the inlet port of retentate head 30 since RO element 22 is a closed system and check valve 36 in feed head 28 will not allow return of fluid to feed head 28.

The appropriate fluid pulse amplitude and frequency significantly improves permeate throughput and quality for any given unit area of membrane surface. Due to fluid dynamic considerations, the optimal fluid amplitude and frequency for any given RO element configuration is unique to that configuration. Amplitude of a diaphragm pump is defined by the stroke length of pump 20. A shorter stroke produces less amplitude (volume of fluid per stroke). Stroke length (amplitude) is controlled on diaphragm pump 20 by virtue of manual or motor driven eccentric control knob 40. Likewise, the frequency of the pump stroke is explicitly controlled by the rotational speed of pump motor 26. By virtue of the appropriate controls, amplitude and frequency can be controlled either manually or electronically. By empirically determining the appropriate amplitude and frequency for a given RO element configuration, the correct amplitude and frequency can be dialed in manually to achieve optimal throughput and permeate quality. Conversely, a feedback control loop can be programmed into a computer to allow the pump to electronically optimize product throughput and quality.

The three key parameters are easily measured. First, energy into the system can be optimized by measuring the amperage load on pump motor 26. Second, permeate, or product water, quality can be easily measured by optional conductivity meter 74 which measures the TDS in the product water and verifies performance of RO elements. Other types of water quality detectors may additionally be used. The third and final parameter is the permeate flow rate. This is preferably measured by flow transmitter 76. Alternatively, since the recovery of the system is explicitly defined by the ratio of the swept volumes of feed head 28 versus retentate head 30, then the permeate flow rate is easily determined by the frequency and amplitude of pump 20. The frequency may be electronically monitored by the speed of pump motor 26, and the amplitude may be preferably monitored by the motor position of stroke control knob 40. Optimization control schemes use hardware and software programmable logic controllers ("PLC"). The system is preferably optimized by using a PLC to monitor the pump motor amplitude and speed, product water quality and flow rate to optimize the efficiency of the system.

Significant features of the system of the present invention are that the two interconnected heads of the pump simultaneously provide: (1) a fixed recovery (ratio of product water to feed water); (2) the two interconnected heads provide energy recovery by transferring force from the retentate diaphragm to the feed diaphragm; and (3) the pump imparts a pulsing pressure (and fluid) wave on the RO element.

INDUSTRIAL APPLICABILITY

The invention is further illustrated by the following non-limiting examples.

EXAMPLES

The present invention was developed under a contract funded the U.S. Department of Defense's Defense Advanced Research Projects Agency ("DARPA") to produce a small portable system that will allow individual soldiers to treat any water anywhere to drinking water quality. The research did not focus on membrane chemistry, but rather construction and hydraulic flow characteristics of spiral-wrapped RO element designs. Concurrent with design of the RO elements, a hand pump device was developed that utilizes various features including a simple differential pressure activated valve to produce pressure recovery in the pump to significantly reduce the applied force required to operate the pump.

Advantages of the invention, as demonstrated by the research, include as follows:

Enhanced Recovery. Recovery is defined as the amount of permeate water (clean product water) divided by the volume of feed water that enters an RO element. Typically, RO elements operating on seawater utilize a recovery of 10 percent or less. Extensive tests were conducted on the membranes to determine the amount of water that can be driven through a membrane and still produce acceptable quality permeate. These studies showed that a 30 percent recovery was feasible using the present invention.

Thin Feed Spacer. The feed spacer in a spiral wrapped RO element was constructed of a plastic web mesh that held the faces of the membranes apart so that feed water could flow longitudinally down the length of the element with minimal pressure loss while allowing the water to cross the membrane. On the opposite side of the membrane leaf was the permeate carrier. The permeate carrier was a porous but more structurally rigid material that withstood compression from the membrane surface, but allowed the permeate to flow spirally to a central collection tube where the permeate was collected. Current construction techniques limit existing feed spacer thickness to approximately 0.011 inches thick. Most RO elements utilize feed spacers that are approximately 0.025 inches thick. Hydraulic calculations indicated that a feed spacer that is 0.003 inches thick is adequate to allow flow through the element. The primary advantage of a thin feed spacer is that more membrane element material can be wrapped into a smaller diameter RO element housing, thereby significantly increasing the membrane surface in the RO element. More membrane surface equates to more product water throughput.

Diffusion Effect. Concentration polarization is defined as the buildup, or accumulation, of total dissolved solids (TDS) at the surface of the membrane. As water molecules flow through the membrane surface, ions are rejected and are retained on the feed side of the membrane material. This accumulation of ions represents an increase in the TDS at the surface of the membrane, thereby increasing the osmotic pressure required to drive the water molecules through the membrane surface. The negative result is higher operating pressures and lower production. Diffusion effects (tendency of molecules to diffuse uniformly in a solution) were improved with reduced separation between the membrane faces. Coincidentally, diffusion effects were dramatically improved when the separation between the membrane surfaces approached 0.003 inches. Improved diffusion resulted in reduced concentration polarization resulting in higher permeate quality and throughput. Another feature of thin feed spacers that is conducive to lower TDS is the increased fluid shear which is produced with higher fluid velocity that results from equivalent volumes of feed water traversing a thinner feed spacer thickness.

Hydraulic Feed Water Pulsing. Pulsing of the feed stream to an RO element has a beneficial effect for reduction of concentration polarization, and subsequent improvement in product water throughput. Tests conducted verified this effect, and show improvements, in some cases, greater than 100 percent in product water throughput versus steady flow. These same tests also demonstrated applied pressure reductions of 18 to 19 percent. In other words, in steady flow tests, 800 psi is required to produce acceptable quality permeate. With pulsing, the mean operating pressure that produced the same permeate volume and quantity was 650 psi. Each RO element physical configuration had an optimal frequency and fluid amplitude to achieve maximum performance.

Pressure Recovery via Differential Pressure Activated ("DPA") Valve. During development of the hand held manual RO pump of the invention, a DPA valve was developed that significantly simplified the design of a hand-held RO pump and enabled a pressure recovery feature that significantly reduced the force required to operate the pump. This pump had only three metal parts, namely three stainless steel springs that acted to load check valves in the pump. All other components of the pump were injection molded, thereby producing a simplified RO hand-held pump that is low cost and therefore is disposable.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A filtration system comprising:
   a dual head pump comprising a single primary feed head and a single secondary retentate head separate from said primary feed head;
   a hydraulically actuated differential pressure activated (DPA) valve; and
   a filtration element;
   wherein a front side of said primary feed head comprises a different swept volume than a front side of said secondary retentate head; and
   wherein said DPA valve comprises:
      a single piston slideably disposed in a single chamber, said chamber comprising a feed inlet port, a retentate inlet port, and a retentate discharge port; and
      said piston comprising a feed side and a retentate side; wherein an area of said feed side is larger than an area of said retentate side for keeping said retentate inlet port sealed during a compression stroke of said pump.

2. The filtration system of claim 1 wherein said pump is a diaphragm pump.

3. The filtration system of claim 1 wherein said two heads provide a fixed recovery.

4. The filtration system of claim 1 wherein said two heads comprise diaphragms of differing radii.

5. The filtration system of claim 1 wherein said secondary retentate head is smaller than said primary feed head.

6. The filtration system of claim 1 further comprising a connection between said two heads.

7. The filtration system of claim 6 wherein said connection is mechanical.

8. The filtration system of claim 7 wherein said connection is a shaft.

9. The filtration system of claim 6 wherein a force on said secondary retentate head offsets a force on said primary feed head.

10. The filtration system of claim 1 wherein said valve seals a discharge port of said retentate head when a feed pressure exceeds a retentate pressure.

11. The filtration system of claim 10 wherein said valve is hydraulically activated.

12. The filtration system of claim 10 wherein said connection and said valve provide a pressure recovery to said filtration system.

13. The filtration system of claim 12 wherein said pressure recovery reduces energy required to operate said filtration system.

14. The filtration system of claim 1 wherein said filtration element comprises a reverse osmosis element.

15. The filtration system of claim 14 wherein said reverse osmosis element comprises a spiral wrapped element.

16. The filtration system of claim 15 wherein said spiral wrapped element comprises:
   at least one membrane; and
   at least one thin feed spacer.

17. The filtration element of claim 16 wherein said at least one thin feed spacer comprises a plastic web mesh.

18. The filtration system of claim 16 wherein said at least one thin feed spacer is less than approximately 0.025 inches thick.

19. The filtration system of claim 16 wherein said at least one thin feed spacer is less than approximately 0.011 inches thick.

20. The filtration system of claim 16 wherein said at least one thin feed spacer provides for a reduction in an amount of total dissolved solids at a surface of said membrane.

21. The filtration system of claim 1 wherein at least one parameter of an optimized pulsed fluid flow produced by said pump is determined by a configuration of said filter element.

22. The filtration system of claim 21 wherein said parameter is selected from the group consisting of pulse frequency and pulse amplitude.

23. The filtration system of claim 21 further comprising at least one control to vary said at least one parameter.

24. The filtration system of claim 23 wherein said control is manual.

25. The filtration system of claim 23 wherein said control is automatic.

26. The filtration system of claim 23 further comprising at least one permeate quality monitoring device.

27. The filtration system of claim 26 wherein said at least one permeate quality monitoring device comprises a flow meter.

28. The filtration system of claim 26 wherein said at least one permeate quality monitoring device measures total dissolved solids.

29. The filtration system of claim 28 wherein said at least one permeate quality monitoring device comprises a conductivity meter.

30. The filtration system of claim 26 further comprising a feedback loop, wherein said control is varied to optimize a quality of permeate as determined by said permeate quality monitoring device.

31. The filtration system of claim 30 further comprising an electrical measurement device, wherein said electrical measurement device measures an amperage load on said system.

32. The filtration system of claim 31 wherein said control is varied additionally to minimize said amperage load on said system.

33. A method for filtering a substance comprising the steps of:
providing at least one filtration element;
providing a dual head pump which pumps a pulsed flow of the substance to the filtration element, the dual head pump comprising a single primary feed head and a single secondary retentate head separate from said primary feed head, wherein a front side of said primary feed head comprises a different swept volume than a front side of said secondary retentate head;
sealing a discharge port of a retentate head with a hydraulically actuated DPA valve when a feed pressure exceeds a retentate pressure; and
varying at least one parameter of the pulsed flow to optimize a desired characteristic of permeate filtered by the filtration element and the pump;
wherein the DPA valve comprises:
a single piston slideably disposed in a single chamber, the chamber comprising a feed inlet port, a retentate inlet port, and a retentate discharge port; and
the piston comprising a feed side and a retentate side;
wherein an area of the feed side is larger than an area of the retentate side for keeping the retentate inlet port sealed during a compression stroke of the pump.

34. The method of claim 33 wherein the step of providing a pump comprises providing a diaphragm pump.

35. The method of claim 33 wherein the step of providing a dual head pump further comprises connecting the two pump heads.

36. The method of claim 33 wherein the step of providing a dual head pump further comprises providing a pressure recovery.

37. The method of claim 36 wherein the step of providing a pressure recovery further comprises reducing energy required to filter the substance.

38. The method of claim 33 wherein the step of providing a filtration element comprises providing a reverse osmosis element.

39. The method of claim 38 wherein the step of providing a reverse osmosis element comprises providing a spiral wrapped element.

40. The method of claim 39 wherein the step of providing a spiral wrapped element comprises providing at least one membrane and at least one thin feed spacer in the element.

41. The method of claim 40 wherein the step of providing at least one membrane and at least one thin feed spacer in the element comprises reducing the amount of total dissolved solids at a surface of the membrane.

42. The method of claim 33 wherein the step of varying at least one parameter of the pulsed flow comprises varying a pulse frequency and a pulse amplitude.

43. The method of claim 33 wherein the step of varying at least one parameter of the pulsed flow further comprises measuring a desired characteristic of permeate.

44. The method of claim 43 wherein the step of measuring the desired characteristic of the permeate comprises measuring a permeate flow rate.

45. The method of claim 43 wherein the step of measuring the desired characteristic of the permeate comprises measuring total dissolved solids in the permeate.

46. The method of claim 43 wherein the step of varying at least one parameter of the pulsed flow further comprises measuring an amperage load on the pump.

47. The method of claim 46 wherein the step of measuring the amperage load on the pump further comprises minimizing the amperage load on the pump.

48. The method of claim 46 further comprising providing a feedback loop to automatically vary the parameter of the pulsed flow, thereby optimizing the desired characteristic of the permeate and pump.

49. A pressure recovery filtration system comprising:
a dual head pump comprising a single primary feed head, a single secondary retentate head separate from said primary feed head and a single connection between the two heads;
a filtration element; and
a hydraulically actuated differential pressure activated (DPA) valve;
wherein a front side of said primary feed head comprises a different swept volume than a front side of said secondary retentate head; and
wherein said DPA valve comprises:
a single piston slideably disposed in a single chamber, said chamber comprising a feed inlet port, a retentate inlet port, and a retentate discharge port; and
said piston comprising a feed side and a retentate side;
wherein an area of said feed side is larger than an area of said retentate side for keeping said retentate inlet port sealed during a compression stroke of said pump.

50. The pressure recovery filtration system of claim 49 wherein at least one of said heads comprises a diaphragm.

51. The pressure recovery filtration system of claim 49 wherein said connection is mechanical.

52. The pressure recovery filtration system of claim 51 wherein said single connection is a shaft.

53. The pressure recovery filtration system of claim 49 wherein a force on said secondary retentate head offsets a force on said primary feed head.

54. The pressure recovery filtration system of claim 53 wherein said valve seals a discharge port of said retentate head when a feed pressure exceeds a retentate pressure.

55. The pressure recovery filtration system of claim 54 wherein said valve comprises an inlet port connected to said retentate head and an inlet port connected to said feed head.

56. The pressure recovery filtration system of claim 55 wherein said valve actuates according to a relative pressure difference between said inlet ports.

57. The method of claim 33 wherein the two pump heads are connected by a single shaft.

* * * * *